J. C. SHERMAN.
MOTOR CARRIAGE.
APPLICATION FILED AUG. 21, 1905.
902,692.
Patented Nov. 3, 1908.
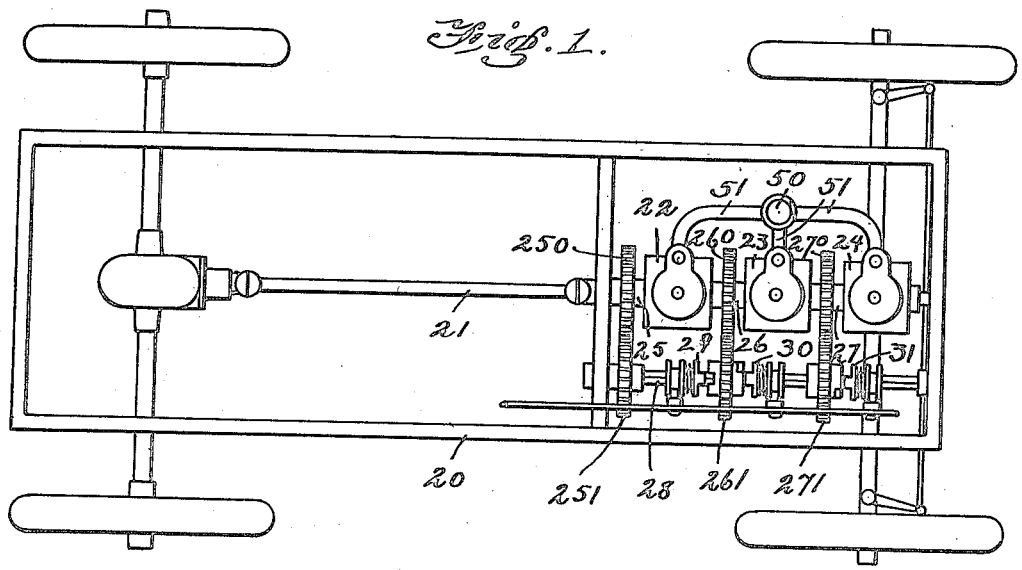
Fig. 1.
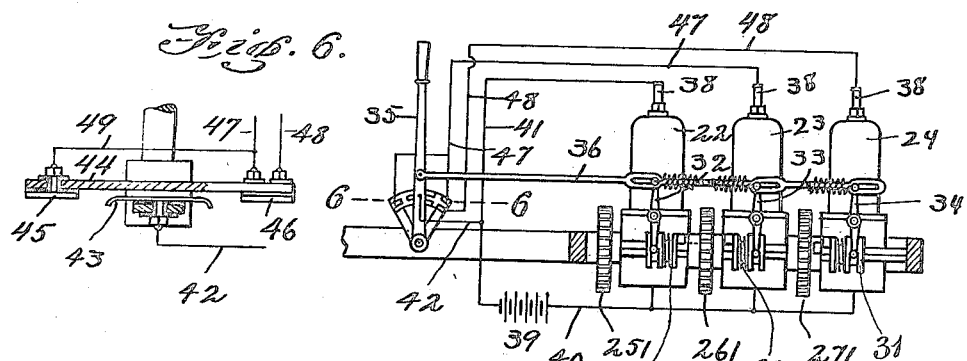
Fig. 6. Fig. 2.
  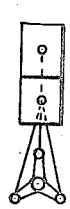
Fig. 3. Fig. 4. Fig. 5.
Witnesses:
Rollin Abell
C. C. Stecher
Inventor:
John C. Sherman
by Wright, Brown, Quinby & May
Attys.

UNITED STATES PATENT OFFICE.

JOHN C. SHERMAN, OF BROOKLINE, MASSACHUSETTS.

MOTOR-CARRIAGE.

No. 902,692.

Specification of Letters Patent.

Patented Nov. 3, 1908.

Application filed August 21, 1905. Serial No. 274,977.

*To all whom it may concern:*

Be it known that I, JOHN C. SHERMAN, of Brookline, in the county of Norfolk and State of Massachusetts, have invented certain new and useful Improvements in Motor-Carriages, of which the following is a specification.

This invention relates to motors of the combustion-engine type and has for its object to provide a plurality of either two- or four cycle engine-cylinders so combined and related that all or part of the total number of cylinders may be immediately available for use and in such alterable relative positions of cranks as to secure uniformity of torque or rotating moment, with such provisions that the number of operating cylinders and the alterable relative positions are determined by the operator in accord with the amount of mechanical power required.

To accomplish this purpose, I provide a multi-cylinder engine of the combustion type, of a maximum power-capacity equal to the maximum normal demand to be made thereof, and I divide the crank-shaft into two or more sections, each separate section thereof being operated by one or more cylinders, pistons, and piston-rods; said separate sections of the main or engine-shaft transmitting the power of their respective cylinders to a common driven member through gears or clutches. The gears or clutches are so designed, as hereinafter set forth, that at all times the cranks of such cylinders as are in use are held in symmetrical angular positions around the circle described by their rotation. Thus, if two cranks, each driven by its respective cylinders and pistons, are operating the common driven member, one of said cranks is at all times 180 degrees in advance of the other (assuming that each set of cylinders is designed to give one impulse in each rotation of its crank, as in the case of a single two-cycle engine); thus also if three cranks are simultaneously connected to the driven member and are transmitting power thereto, one of said cranks shall be at all times 120 angular degrees in advance of one and 120 angular degrees behind the other of the two remaining cranks, assuming also in this case that the engine units are all of the two-cycle type.

In the operation of combustion-engines at the present date, it is customary to vary the amount of combustible material delivered to the engine for the purpose of varying the power generated thereby, and in other cases to secure a variation in the amount of power generated by changing the sparking action of the engine so that it operates, from its highest efficiency to a relatively low efficiency, or vice versa.

It will be readily understood that when an engine is not operating at its point of highest efficiency, there is a waste of power and a waste of the combustible material. Consequently, my invention, as hereinbefore briefly stated, provides for the utilization of a plurality of engine units, as I may term them, each of which is designed to operate at its highest point of efficiency at all times.

Referring to the accompanying drawings, which illustrate conventionally different embodiments of the invention,—Figure 1 represents in plan view a motor carriage equipped with one form of the invention. Fig. 2 represents the engines and their adjacent mechanism in side elevation. Figs. 3, 4 and 5 are diametric views, illustrating the relative positions of the cranks when one, two or three engines are in operation. (Assuming all to be of two-cycle type.) Fig. 6 represents the mechanism for controlling the sparking circuit, said figure being an enlarged representation of a section on line 6—6 of Fig. 2.

The body of the motor-carriage is indicated at 20. This, as stated, is illustrated conventionally and may be constructed in any suitable or desirable manner. The driving wheels of the carriage are driven from a shaft 21. Three engine-units are illustrated at 22 23 24, respectively. They may be of the two-cycle or four-cycle type, and each is equipped with the usual cylinder, piston and piston-rod. The crank-shaft is divided into sections indicated at 25 26 27, each of which is adapted to rotate independently of the others.

The engine unit 22 is designed to have a permanent driving connection with the shaft 21 through section 25, while the shaft-sections 26 and 27, which are separately driven, respectively, by the engine units 23 and 24, are arranged to be connected through clutch devices with the shaft 21. In the drawings the clutches and their shafts or sleeves are only shown somewhat conventionally since they are or may be of any well-known or preferred type, and detailed description or illustration thereof will not be necessary to an understanding of the present invention.

The shaft sections 25, 26, 27, are provided with gears 250, 260, 270, respectively, said gears meshing with gears 251, 261, 271 respectively which are connected with clutch members presently described.

The counter or clutch shaft 28 is mounted to rotate in suitable bearings, and the gears 261 and 271 are loose thereon. The gear 251 is fast on shaft 28. Mounted on said shaft to rotate therewith but capable of being shifted longitudinally thereof, are clutch members 29, 30, 31, said members being shifted by means of levers 32, 33, 34 respectively, said levers having the usual pins or forks entering annular grooves in the movable clutch members. These movable members are represented as of a well-known form comprising the jaw part and the annularly-grooved part having an interposed spring to throw in the jaw part yieldingly.

The movable clutch members 29, 30, have their jaws facing toward opposite sides of the hub of the gear 261, and said hub is formed with jaws so spaced relatively to the jaws of the two movable clutch members that the rotative position in which the gear 261 will be clutched to the shaft will be different according to whether said hub is engaged by clutch 29 or clutch 30. The construction is such, as will be hereinafter described, that only one of the clutches 29 or 30 can engage the hub at the same time. As will be clear at this point, when all of the clutches are in the disengaged positions shown in the drawings, only the engine unit 22 will be actuating the shaft 21, as indicated in Fig. 3, the gear 251 and the movable clutch members running idly, and the gears 261 and 271 remaining stationary, since they are loose on the counter-shaft 28. The engine units 23 and 24 are now inoperative. But when clutch member 29 is engaged with the hub of gear 261, and the unit 23 at the same time brought into action as hereinafter described, the power of unit 23 becomes a force (through gears 260 and 261, clutch 29, shaft 28 and gears 251 and 250) in addition to the power of unit 22. The arrangement of the jaw clutch 29 relatively to the gear 261 is such that the clutch becomes operative when the units 22 and 23 are opposite each other in stroke, thus balancing their power. The relative positions of the cranks of the two units at this time are indicated conventionally in Fig. 4.

The jaws of the clutch members 30, 31 and the coöperating jaws formed in or on the hubs of the gears 261, 271, are so spaced relatively to each other that when both of the units 23, 24 are coupled up through the medium of said clutches, the jaws of said clutches will only engage or interlock when the strokes of the three units are uniformly spaced; that is when the cranks of the three units are at an angle of 120 degrees to each other as indicated in Fig. 5.

The means which I have shown for actuating the clutch levers comprise a hand lever 35 and a link 36 having three slots through which the upper ends of the levers 32, 33, 34 pass. The slots are so formed in the link, as shown in Fig. 2, as to allow lost motion that will enable the lever 36 to actuate the clutch levers in the following manner. With the parts in the position shown in Fig. 2, only the engine unit 22 will be at work, as above described. By throwing the hand lever 35 to the left, the clutch 29 connects gear 261 operatively with the counter-shaft, the slots in the link 36 permitting said link to move to the left without effecting the clutch levers 33, 34. By throwing the hand lever over to the extreme right, the clutch 29 is disengaged from its side of the gear 261, and the clutches 30 and 31 are simultaneously engaged respectively with the other side of gear 261 and with gear 271. As has been stated, the jaws of these clutches are so formed that they will take or engage when the gears 261, 271 are in the positions which they occupy when the cranks of the three units are in the position shown in Fig. 5.

If desired, springs may be connected to the link 36 and the upper ends of the clutch levers to produce a tendency of the clutches to automatically disengage when permitted to do so by the movements of the link.

Of course it is essential that when the gears of the units 23 and 24 are connected or disconnected as has been described, the units themselves shall be started and stopped. The means which I have illustrated for doing this comprise devices for completing or breaking the circuits of the spark plugs of the engine units, said spark plugs being indicated conventionally at 38.

A suitable source of electricity is indicated at 39, one pole being connected by wire 40 and suitable branches to all of the units. That is, each branch will connect electrically with one terminal of a spark plug of one unit.

From the opposite pole of the battery 39 a wire 41 leads to the other terminal of the spark plug of unit 22. This is the constantly-working unit; the one that affords all the power when the minimum of power is required.

A wire 42 connects the wire 41 with a contact 43 (see Fig. 6) carried by and insulated from the lever 35. A suitably supported plate 44 adjacent to the lever 35 carries a contact 45 at one end and a twin contact 46 at the other end, these two contacts being insulated from each other. Two wires 47 and 48 lead from the contacts 46 to the spark plugs of the engine units 23 and 24 respectively, and a wire 49 connects the contact 45 with the wire 47.

When the lever 35 is in the intermediate position, as shown in Fig. 2, there is no circuit through any part of the lever or switch mechanism. The circuit being closed from the battery through the wires 40 and 41 to the spark plug of the unit 22, there is no necessity of any operation of the switch. But when it is desired to add the power of the engine unit 23, and the lever 35 is operated as hereinbefore described to throw the clutch 29 into connection with the hub of the gear 261 which meshes with the gear 260 driven by the unit 23, such motion of the lever 35 brings the contact 43 over to the contact 45 and thus enables the battery current to pass through branch wire 42 and through the contacts 43, 45, wire 49 and wire 47 to the spark plug of the unit 23. And when it is desired to utilize the power of all three engine units, and the lever 35 is thrown to the right to disengage clutch 29 and engage the clutches 30 and 31 with the hubs of the gears 261 and 271, as hereinbefore described, then the contact 43 passes over to the twin contacts 46 with which both wires 47 and 48 are connected. As said wires 47 and 48 lead to the spark plugs of the two engine units 23 and 24 respectively, the said two units 23 and 24 become operative and their power is added to that of the units 22 through the clutch or counter shaft and the gears 251 and 250.

In order that the plurality of separate combustion engine units 22, 23 and 24 may receive their combustible material from a common source of supply, I may employ a single conduit or pipe 50 leading from a suitable source and having branches 51 connected with the several units.

Assuming that each engine unit is capable of developing five-horse power, it will be seen that as each is connected up for operation, they finally transmit to the shaft 21 the equivalent of fifteen-horse-power.

It will be understood that the invention is not limited to the details of construction which I have seen fit to illustrate, and further that the phraseology which I employ is for the purpose of description, and not of limitation.

The lever 35 and the link 36 and the clutch levers operated thereby constitute a controller or controlling means for the connections between the several engine units adapted to be rendered active or inactive.

Having thus explained the nature of the invention, and described a way of constructing and using the same, although without attempting to set forth all of the forms in which it may be made, or all of the modes of its use, I declare that what I claim is:—

1. In a motor-vehicle, the combination with a plurality of combustion-engine units, of a common driven member, and driving connections between each of said engine units and said driven member, said connections being adapted to connect different engine units or different combinations of engine units with said driven member, and a single controller for said connections.

2. In a motor-carriage, the combination with a plurality of separate combustion-engine units and a source of supply for delivering combustible material thereto, of a common driven member, a plurality of clutches for clutching said units to said common driven member singly or in combination, and a single controller lever for controlling all of said clutches.

3. A motor for motor-vehicles comprising a plurality of combustion-engine units, a common driven member, driving connections between each of said engine-units and said driven member, said connections being adapted to be rendered active or inactive, and means for simultaneously controlling said connections and the current for the spark plugs of the units.

4. A motor for motor-vehicles comprising a plurality of combustion-engine units, a common driven member, driving connections by which said combustion-engine units may be disconnected from or connected with said driven member singly or in combination, electrical circuits for the several units, and means for automatically controlling the circuits when the driving connections are operated.

5. An apparatus of the character specified, comprising a plurality of combustion-engine units, each having a gear driven thereby, a counter-shaft having gears meshing with the gears of said units, some of the gears on the counter-shaft being loose thereon and formed with clutch members, complemental clutch members on said counter-shaft, and means for actuating said complemental clutch members.

6. An apparatus of the character specified, comprising a plurality of combustion-engine units, each having a gear driven thereby, a counter-shaft having gears meshing with the gears of said units, some of the gears on the counter-shaft being loose thereon and formed with clutch members, complemental clutch members on said counter-shaft, means for actuating said complemental clutch members, electrical connections for rendering the units operative, and a lever having connections for controlling the clutches and carrying means for controlling the electrical circuits.

7. A motor for motor-vehicles, comprising a plurality of combustion-engine units, a common driven member, driving connections between each of said engine units and said driven member, said connections being adapted to be rendered active or inactive, and means whereby different engine units will be automatically connected with the driven member at equally spaced angles of application of power.

8. A motor for motor-vehicles, comprising a plurality of gas-engine units, a common driven member, driving connections between each of said engine units and said driven member, said connections being adapted to be rendered active or inactive, and means for throwing the engine units into connection with the common driven member with their cranks equally spaced.

9. A motor for motor-vehicles, comprising a plurality of engine units, a common driven member, driving connections between each of said engine units and said driven member, said connections being adapted to be rendered active or inactive, and means whereby said connections, when rendered active, will be brought into action in a predetermined step to preserve the proper balance in the application of the power of the units to the driven member.

10. A motor for motor-vehicles, comprising a plurality of engine units, a common driven member, and mechanism for connecting a variable number of units to the common driven member so that the power will be applied to the driven member in equally spaced sequence.

In testimony whereof I have affixed my signature, in presence of two witnesses.

JOHN C. SHERMAN.

Witnesses:
M. B. May,
A. W. Harrison.